US012686373B2

(12) United States Patent
Eckert

(10) Patent No.: US 12,686,373 B2
(45) Date of Patent: Jul. 21, 2026

(54) METHOD FOR ADJUSTING BRAKE PRESSURES OF A VEHICLE VIA CONTROL OF A PRESSURE CONTROL VALVE, BRAKE SYSTEM FOR CARRYING OUT THE METHOD AND MOTOR VEHICLE

(71) Applicant: ZF CV Systems Hannover GmbH, Hannover (DE)

(72) Inventor: Horst Eckert, Rehburg-Loccum (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 476 days.

(21) Appl. No.: 17/519,755

(22) Filed: Nov. 5, 2021

(65) Prior Publication Data

US 2022/0055594 A1 Feb. 24, 2022

Related U.S. Application Data

(63) Continuation of application No. 15/534,027, filed as application No. PCT/EP2016/000177 on Feb. 3, 2016, now Pat. No. 11,198,421.

(30) Foreign Application Priority Data

Feb. 7, 2015 (DE) ..................... 10 2015 001 628.8

(51) Int. Cl.
*B60T 8/36* (2006.01)
*B60T 13/68* (2006.01)

(52) U.S. Cl.
CPC .............. *B60T 13/683* (2013.01); *B60T 8/36* (2013.01); *B60T 8/3605* (2013.01); *B60T 2270/10* (2013.01)

(58) Field of Classification Search
None
See application file for complete search history.

(56) References Cited

U.S. PATENT DOCUMENTS 5,615,931 A 4/1997 Stumpe et al.
6,149,251 A 11/2000 Wuerth et al.
(Continued)

FOREIGN PATENT DOCUMENTS

DE 2406690 A1 8/1975
DE 19615294 A1 10/1997
(Continued)

OTHER PUBLICATIONS

WO2005066004A1 Description English Translation (Year: 2005).*
(Continued)

*Primary Examiner* — Adam D Tissot
*Assistant Examiner* — Laura E Linhardt
(74) *Attorney, Agent, or Firm* — LEYDIG, VOIT & MAYER, LTD.

(57) ABSTRACT

A method for adjusting brake pressures of a motor vehicle. The method includes actuating, by a control unit, while taking into account determined dynamic state variables of wheels that are to be braked, a pressure control valve with an inlet valve for ventilating and with an outlet valve for venting a brake pressure line that is controlled by the pressure control valve. The control times of the outlet valve are determined depending on control of the inlet valve. In an external braking mode provided for a case where an external braking demand is received that is independent of a driver's braking demand, the control unit adjusts the brake pressure in the brake pressure line according to the external braking demand by determining control times of the outlet valve depending on control of the inlet valve.

20 Claims, 5 Drawing Sheets

(56) References Cited

U.S. PATENT DOCUMENTS

| | | | |
|---|---|---|---|
| 8,641,152 B2 | 2/2014 | Pursifull et al. | |
| 9,566,960 B2 | 2/2017 | Feigel | |
| 2009/0102278 A1 | 4/2009 | Batistic et al. | |
| 2011/0144855 A1 | 6/2011 | Herges et al. | |
| 2011/0231076 A1* | 9/2011 | Watanabe | B60T 8/1755 |
| | | | 701/70 |
| 2012/0215414 A1 | 8/2012 | Watanabe | |
| 2014/0244128 A1 | 8/2014 | Watanabe | |
| 2015/0158477 A1 | 6/2015 | Luehrsen | |
| 2015/0298664 A1* | 10/2015 | Nimura | B60T 8/17 |
| | | | 701/70 |
| 2016/0039398 A1 | 2/2016 | Roll et al. | |
| 2016/0152217 A1 | 6/2016 | Yamamoto | |
| 2016/0251005 A1* | 9/2016 | Morselli | B60T 8/17 |
| | | | 701/50 |

FOREIGN PATENT DOCUMENTS

| | | | | | |
|---|---|---|---|---|---|
| DE | 102004042647 A1 | 8/2005 | | | |
| DE | 102005009738 A1 | 9/2006 | | | |
| DE | 102008029310 B4 | 1/2012 | | | |
| DE | 102013203594 A1 | 9/2013 | | | |
| DE | 102013222061 A1 | 9/2014 | | | |
| DE | 102013210563 A1 | 12/2014 | | | |
| EP | 1028043 B1 | 3/2005 | | | |
| JP | H10119739 A | 5/1998 | | | |
| JP | H11240430 A | 9/1999 | | | |
| KR | 100362949 B1 | 2/2003 | | | |
| WO | WO-2005066004 A1 * | 7/2005 | | | B60T 8/36 |

OTHER PUBLICATIONS

Robert Bosch GMBH, "Kraftfahrtechnisches Taschenbuch," Jan. 2007, pp. 852-861 and 899-901, Verlag Friedr. Vieweg & Sohn GWV Fachverlage GmbH Wiesbaden, Wiesbaden, Germany.

European Patent Office, "Notice of Opposition" against EP-Patent EP3253630B1, Jan. 2022, pp. 1-45, European Patent Office, Munich, Germany.

* cited by examiner

METHOD FOR ADJUSTING BRAKE PRESSURES OF A VEHICLE VIA CONTROL OF A PRESSURE CONTROL VALVE, BRAKE SYSTEM FOR CARRYING OUT THE METHOD AND MOTOR VEHICLE

CROSS REFERENCE TO RELATED APPLICATIONS

This application is continuation of U.S. patent application Ser. No. 15/534,027, filed Jun. 8, 2017, which is a U.S. National Stage Application under 35 U.S.C. § 371 of International Application No. PCT/EP2016/000177 filed on Feb. 3, 2016, and claims benefit to German Patent Application No. DE 10 2015 001 628.8 filed on Feb. 7, 2015. The International Application was published in German on Aug. 11, 2016 as WO 2016/124332 A1 under PCT Article 21(2).

FIELD

The invention is directed to a method for adjusting the brake pressures of a motor vehicle. In addition, the invention is directed to a brake system for carrying out a method for adjusting brake pressure and to a motor vehicle with such a brake system for carrying out the method.

BACKGROUND

For braking a motor vehicle, the wheels of the motor vehicle are braked, whereby the brake cylinders of the wheels are usually operated. In the case of commercial vehicles, the necessary brake pressure is usually generated pneumatically. If the driver of the vehicle demands braking by means of a brake pedal, then the brake system converts the driver's braking demand into a brake pressure corresponding to the driver's braking demand. For this, the brake pedal acts via a service brake valve or is implemented as a displacement sensor producing a signal.

Anti-lock brake systems (ABS) are regulating devices in the brake system that prevent locking of the wheels when braking and thereby maintain steerability and driving stability. A control unit adjusts the brake pressure in the connected brake cylinders while taking into account determined dynamic state variables of the wheels that are to be braked by means of a pressure control valve on the respective wheel. The dynamic state variable is often determined from the measurement results of revolution rate sensors on the wheels. If a tendency to lock occurs on a wheel, then wheel circumferential deceleration and wheel slip increase significantly. If the determined dynamic state variable exceeds certain critical values, the control unit intervenes by suitable control measures via the pressure control valve. In this case, the stability and the instability of the wheel movement are repeatedly alternately detected during the intervention and are usually set in the slip range with maximum braking force by a series of pressure build-up, pressure holding and pressure reduction phases.

EP 1 028 043 B1 discloses such a pressure regulator for commercial vehicles, whereby the pressure control valve comprises a 2/2-way valve acting as an inlet valve and a 2/2-way valve acting as an outlet valve. In the case of the known device, the operation of the inlet valve is carried out during the pressure build-up phase. Under certain preconditions, operation of the inlet valve is also carried out during the pressure maintenance phase or even during the pressure reduction phase. The outlet valve is mainly operated during the pressure reduction phase. However, the outlet valve can also be operated during the pressure maintenance phase or during the pressure build-up phase in the case of the known device, likewise in the presence of certain preconditions. The operation of the outlet valve during the pressure build-up phase, or of the inlet valve during the pressure reduction phase, is intended to enable a counter control measure, i.e. the reduction of tendencies to overshoot in the case of rapidly changing pressure.

The pressure control valve with the combination thereof of an inlet valve and an outlet valve is used and employed by the control unit for interventions into the anti-lock brake system. The inlet valve is normally open, i.e. conducting, and the outlet valve closed, whereby during normal braking operation corresponding brake pressure is built up via a service brake valve because of the driver's demand.

Conventionally, the control units of anti-lock brake systems adjust the brake pressure according to so-called internal braking demands, i.e. as control interventions in the context of the anti-lock brake system. In addition to the control interventions within the anti-lock brake system by the control unit that are determined independently of the driver, the internal braking demands can also take into account the driver's demand, in particular if a driver's braking demand is generated by means of an electric braking signal transmitter and input into the control unit.

It has been shown that even in the case of control of the brake pressure by means of the pressure control valves of the anti-lock brake system, large pressure steps often occur that result in an unsatisfactory control quality of the brake pressure and thereby ultimately in the deceleration of the vehicle. Especially if the pressure drop between the prevailing supply pressure at the inlet valve and the controlled brake pressure is large, unacceptably large steps in the pressure changes occur. This is especially the case at the start of braking in the case of an external braking demand.

In particular, in the case of small volumes to be ventilated, the pressure steps are so large that to date only a completely unsatisfactory control quality can be achieved. Small volumes frequently occur for example in the case of towing vehicles with small brake cylinders or vehicle combinations with control of the brake system of the trailer vehicle by the towing vehicle.

Moreover, small pressure steps are often desired, for example during the adjustment of the brake pressure because of an external braking demand. That is, apart from the internal braking demands, in particular the control interventions of the anti-lock brake system, the brake system of the motor vehicle must often also implement external braking demands. In this case, external braking demands can be demands by other driver assistance systems of the vehicle. In particular, in the case of commercial vehicles, various driver assistance systems with separate devices are arranged. In the presence of certain prerequisites for intervention, each of said driver assistance systems can determine a braking requirement that is to be implemented by the brake system.

The brake pressure is not usually controlled in a closed control loop in the event of external braking demands, but is only simply controlled. During the control of the brake pressure, demanded/actual value matching is not carried out because no actual value measurement of the brake pressure is provided or present. It is known in this case to control the brake pressure by means of a 3/2-way valve. Such a 3/2-way valve, however, only provides two switch states, namely on the one hand to increase the brake pressure and on the other hand to reduce the brake pressure. During control, a frequent change between pressure rise and pressure reduction is carried out with maximum gradients in each case, whereby in each case the gradient is a function of the current pressure level conditions, i.e. on the one hand the ratio of the prevailing supply pressure to the controlled brake pressure and the ratio of the controlled brake pressure to the reference pressure (atmosphere). Furthermore, the gradient is influenced by the volume of the brake cylinder to be ventilated.

That is, the pressure control valves of the anti-lock brake systems are usually optimized for the purposes of the anti-lock brake system and comprise large air input and output cross-sections. Just because of the large cross-sections, however, in the case of external braking demands unsatisfactory pressure regulation quality occurs, so that often 3/2-way valves are preferred for controlling the brake pressure in the case of external braking demands and are suitably actuated for adjustment of the brake pressure.

In particular, small brake volumes are also regularly to be provided with air when using trailer vehicles if the brake system of the trailer vehicle is controlled indirectly via a brake pressure line from the towing vehicle. In this case, a comparatively small volume between the pressure control valve and a further valve upstream of the input of the trailer's brake system is to be vented or ventilated.

SUMMARY

In an embodiment, the present invention provides a method for adjusting brake pressures of a motor vehicle. The method includes actuating, by a control unit, while taking into account determined dynamic state variables of wheels that are to be braked, a pressure control valve with an inlet valve for ventilating and with an outlet valve for venting the brake pressure line that is controlled by the pressure control valve. The control times of the outlet valve are determined depending on control of the inlet valve.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
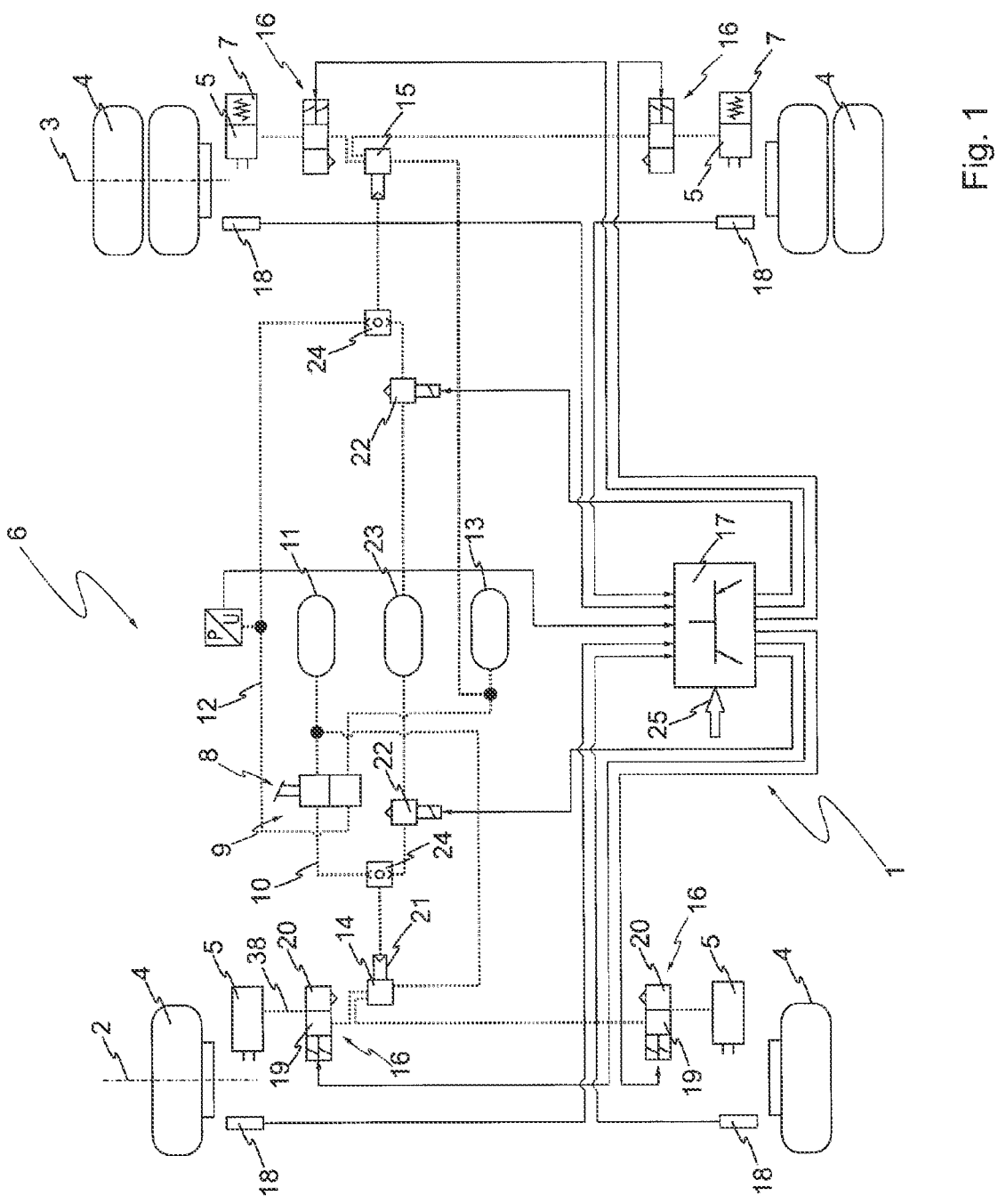
FIG. 1 shows a pneumatic and electrical schema of an anti-lock brake system in a commercial vehicle.

Embodiments of the present invention can enable more accurate and faster brake pressure adjustments while reducing the quantity of air demanded. Control times of an outlet valve of a pressure control valve can be determined based on the control of the inlet valve in various embodiments of the present invention. Accordingly, the control times of the outlet valve can be determined based on the control of the inlet valve. A pressure control valve of an anti-lock brake system can be controlled not only as a common unit of a combined valve, but two separately controllable valves can be specified. Owing to the dependency of the control times of the outlet valve on control of the inlet valve, small pressure changes that are necessary for high control quality in the case of small volumes that are to be ventilated can also be effected.

Embodiments described herein are particularly suitable for adjustment of brake pressure in brake systems that comprise comparatively small volumes that are to be ventilated and vented via a pressure control valve. In an advantageous embodiment, the control unit provides that control times of the outlet valve of the pressure control valve are determined depending on the control of the inlet valve in an external braking mode, i.e. for implementing an external braking demand. Accordingly, the control unit is implemented to receive an external braking demand that is independent of the driver's braking demand and to determine the control times of the outlet valve depending on the control of the inlet valve.

Driver assistance systems that specify an external braking demand are for example roll stability systems (RSC=roll stability control) and distance control systems (ACC=adaptive cruise control). Owing to the control of the outlet valve, possibly at the same time as the control of the inlet valve, embodiments described herein can enable very small pressure steps and thereby high control quality. For example, in the case of stability systems for vehicle combinations (CSC=combination stability control), extremely small pressure steps can be controlled via an outlet valve, approximately in steps starting from zero and rising according to a predetermined function. In particular, the brake system of the trailer vehicle can be controlled via the pressure control valve with an inlet valve and an outlet valve and via the control valve controlling the brake system of the trailer vehicle with extremely small pressure steps. In addition, in the case of a brake system with braking of individual wheels, adjustment of the brake pressure by determining the control times of the outlet valve of the pressure control valve depending on the control of the inlet valve is advantageous. Furthermore, in the event of an anti-locking intervention of an anti-lock brake system (ABS), high control quality can also be achieved by determining the control times of the outlet valve of the pressure control valve depending on the control of the inlet valve.

In an advantageous embodiment, a brake system of a trailer vehicle can be indirectly activated via a brake pressure line for the trailer vehicle and a pressure control valve disposed in said brake pressure line. In this case, a brake pressure line for the trailer vehicle with the pressure control valve disposed in said brake pressure line is connected to a pneumatic coupling head, to which a brake system of the trailer vehicle can be coupled. That is, in this way only a small volume in the brake pressure line between the pressure control valve and a further valve at the input to the brake system of the trailer vehicle is to be ventilated.

The control times of the outlet valve are determined in one embodiment of the invention by the addition of a predetermined period of time, for example three milliseconds, to the control time of the preceding control time of the inlet valve.

If the control times of the inlet valve and of the outlet valve overlap at least partly in the event of increases in pressure, at least in the lower brake pressure range, then excessive pressure steps are prevented, even in the case of small volumes to be ventilated.

In an advantageous embodiment of the invention, the number of times the inlet valve is actuated during the build-up of brake pressure is counted and the control times of the outlet valve are determined depending on the number of times the inlet valve has already been actuated. That is, a plurality of mutually time offset actuations of the inlet valve always take place during the braking process. By matching the control time of the outlet valve to the number of openings of the inlet valve already completed, the pressure step caused by opening the inlet valve can be made relative, or excessive pressure steps can be counteracted. The number of actuations of the inlet valve is counted and stored and the respective current order number of the previously completed actuations of the inlet valve is used to determine a corresponding control time of the outlet valve.

In a further advantageous embodiment, the control times of the outlet valve are determined depending on the control times of the inlet valve, so that immediately after actuation of the inlet valve, actuation of the outlet valve is always carried out depending on the past inlet valve control time. In this case, it is possible and provided that actuation of the outlet valve is carried out at the same time as actuation of the inlet valve or offset in time after or before the start of actuation of the inlet valve, always immediately after ending actuation of the inlet valve or even offset in time after ending actuation.

In a further advantageous embodiment, during the external braking mode a correction factor is determined, with which the control times of the inlet valve are weighted for determining the control times of the outlet valve. The control times of the outlet valve are accordingly determined using the correction factor. Advantageously, the correction factor is constantly determined as a function of a measured deceleration of the vehicle according to predetermined determination instructions. In contrast to setting a constant correction factor, therefore the dynamic state of the motor vehicle or the still remaining braking demand is taken into account during the braking process.

In an advantageous embodiment, the correction factor for determining the control times of the outlet valve is determined depending on the control times of the inlet valve on its part depending on a sum of the control times of actuations that have already been carried out of the inlet valve and the control times of the outlet valve that have been previously determined in connection with a reduction of the brake pressure, according to a predetermined characteristic curve. The past control times of the outlet valve that are taken into account during this are control times of the outlet valve that have been determined outside the external braking mode in connection with control for reducing the braking force and that have been stored for determining the correction factor.

In a further embodiment for determining the correction factor as a function of a sum of the control times of the intake valve and the exhaust valve, a predetermined time constant is subtracted from each of the detected control times. The time constant is determined in advance in such a way that a dead time or reaction time is compensated immediately after the opening of a valve.

The pressure control valves are advantageously disposed in brake pressure lines via which a brake cylinder is vented or ventilated on a side of the pressure control valve that is on the other side of a pressure reservoir. The pressure control valves thereby control the brake pressure line downstream of the pressure control valve, i.e. on the side of the pressure control valve that is disposed on the other side of the pressure reservoir.

FIG. 1 shows an electrical-pneumatic plan of a brake system 1 of a motor vehicle 6, in particular of a commercial vehicle. Electric lines are represented by solid lines and pneumatic lines by dotted lines. The motor vehicle 6 comprises two axles in the exemplary embodiment shown, namely a front axle 2 and a rear axle 3, on each of which wheels 4 are disposed on both sides. To brake the wheels 4, a brake cylinder 5 is associated with each wheel 4 that exerts a braking force on the rotating wheel according to the applied pneumatic brake pressure. In this case, brake cylinders 5 with spring mechanisms 7 that are used as a parking brake are provided on the wheels 4 of the rear axle 3.

During the operation of the motor vehicle 6, the driver of the motor vehicle 6 can switch pneumatic pressure through to the brake cylinders 5 by operating a brake pedal 8. In the exemplary embodiment shown, the brake pedal 8 is coupled to a service brake valve 9 that opens when the brake pedal 8 is operated. In other exemplary embodiments, an electric drive signal transmitter is provided, using the electric operating signal of which pneumatic pressure is switched through.

In the exemplary embodiment shown, the brake system 1 of the motor vehicle 6 comprises two brake circuits, of which a first brake circuit 10 can be connected via the service brake valve 9 to a first pressure reservoir 11 and a second brake circuit 12 can be connected to a second pressure reservoir 13. The first brake circuit 10 comprises a first relay valve 14 that is disposed between the service brake valve 9 and the connected brake cylinders 5. Accordingly, in the second brake circuit 12 a second relay valve 15 is disposed between the service brake valve 9 and the connected brake cylinders 6 of the second brake circuit 12.

The brake system 1 of the motor vehicle 40 comprises an anti-lock brake system that when required intervenes via pressure control valves 16 in the braking process of a wheel 4 that is tending to lock. In this case, a pressure control valve 16 that is disposed immediately upstream of the respective brake cylinders 6 is associated with each wheel 4, i.e. in the exemplary embodiment shown between the relay valves 14, 15 and the respective brake cylinders 5, 6. Each pressure control valve 16 is connected to the respective brake cylinder 5 via a brake pressure line 38. The pressure control valves 16 can be electrically actuated by a control unit 17, this being dependent on a dynamic state variable of the braked wheels. For this purpose, a sensor that is a revolution rate sensor 18 in the exemplary embodiment shown is associated with each wheel. The revolution rate sensor 18 senses thereby the state of motion of the wheel. If a tendency to locking occurs on a wheel, i.e. the determined values exceed predetermined limits, then the control unit 17 outputs electrical control commands to the pressure control valve 16 of the wheel 4 that is tending to lock.

The pressure control valves 16 are a combination of at least two solenoid valves, namely an inlet valve 19 and an outlet valve 20. In this case, the inlet valve 19 is principally used to increase pressure or to maintain the pressure in the brake cylinder 5, whereas the outlet valve 20 is opened to reduce the brake pressure and vents the respective connected brake cylinder 5. In the exemplary embodiment, the inlet valve 19 and the outlet valve 20 are 2/2-way valves that can be electrically actuated by the control unit 17.

The inlet valves 19 can be connected via the relay valve 14, 15 to the pressure reservoir 11, 13 of the respective brake circuit 10, 12. This means that the pressure control valves 16 of the first brake circuit 10 of the front axle 2 can be fluidically connected via the first relay valve 14 to the first pressure reservoir 11 and the pressure control valves 16 of the second brake circuit 12 can be connected via the second relay valve 15 to the second pressure reservoir 13.

The control unit 17 is implemented and configured to automatically influence the braking process independently of the driver's demand depending on the dynamic state variables of the wheels that are to be braked and enables the connection between the pressure control valves and the respective connected pressure reservoirs 11, 13 when required. In doing so, the control unit 17 controls a 3/2-way valve 22 that is disposed between the control input 21 of the relay valve 14 and a third pressure reservoir 23.

The service brake valve 9 and the 3/2-way valve 22 of the anti-lock brake system are coupled to the control input 21 of the relay valve 14 via a dual non-return valve 24. Accordingly, a 3/2-way valve 22 is provided in the second brake circuit 12 that is coupled to the relay valve 15 of the second brake circuit 12 via a dual non-return valve 24 of the second brake circuit 12.

The control unit 17 comprises an input for external braking demands 25 and adjusts a brake pressure corresponding to the external braking demand by controlling the pressure control valves 16 in the presence of an external braking demand in an external braking mode that is provided for this purpose. An external braking demand is typically a braking requirement determined by an external driver assistance system of the motor vehicle 6. Such driver assistance systems of the motor vehicle 6 often comprise dedicated control electronics and sensors and can be connected to the control unit 17 of the anti-lock brake system via a data bus, for example. However, an external braking demand does not only mean demands for braking power that are communicated by external driver assistance systems, but can be any type of braking demand that is not included among the internal braking demands of the anti-lock brake system.

Figure 2:
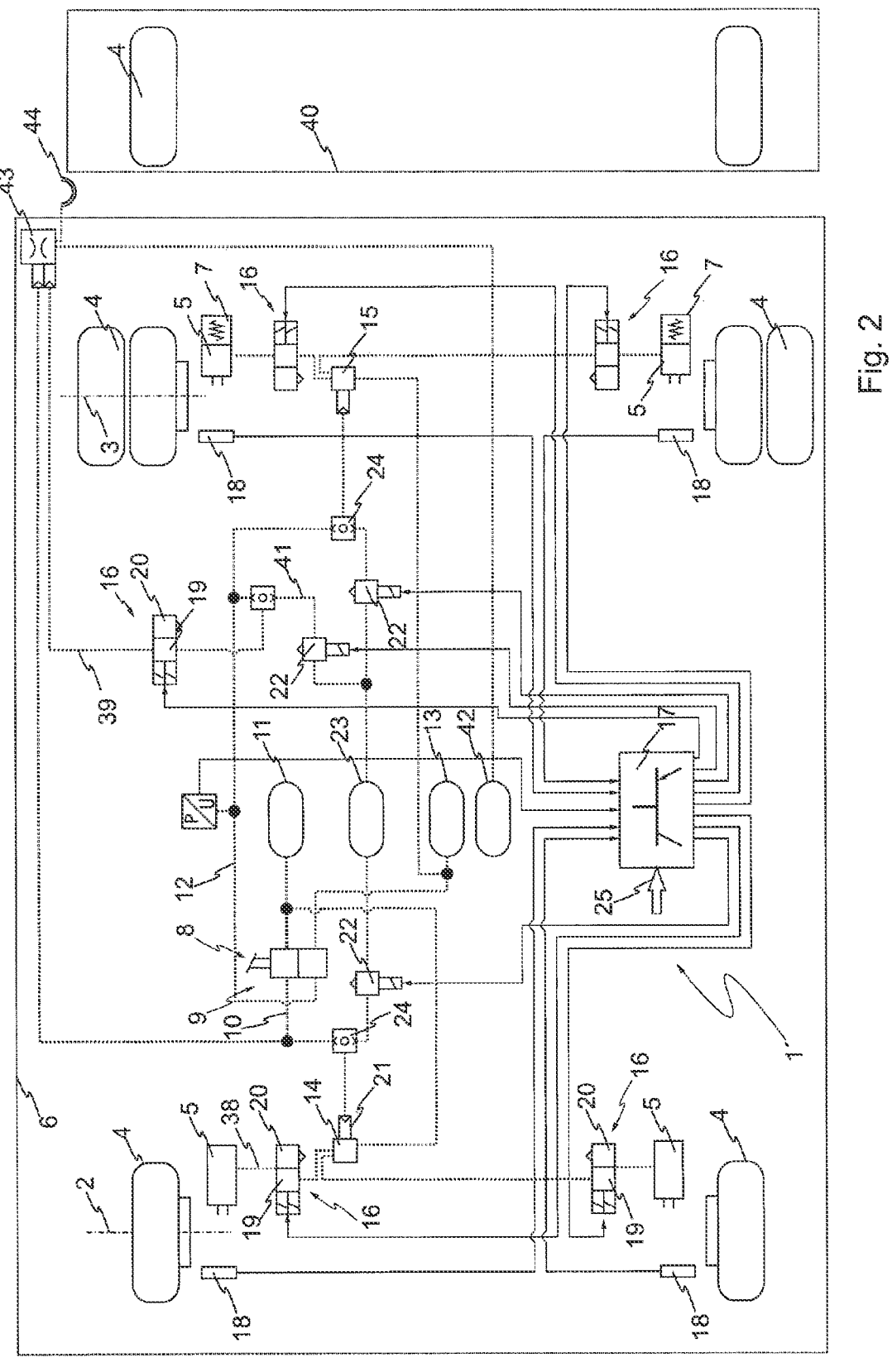
FIG. 2 shows a pneumatic and electrical schema of an anti-lock brake system in a commercial vehicle with a trailer vehicle.

A towing vehicle is represented in the exemplary embodiment according to FIG. 1. FIG. 2 shows an electrical-pneumatic plan of a brake system 1 of a motor vehicle 6, in particular of a commercial vehicle or a towing vehicle of a trailer combination, to which a trailer vehicle 40 or the brake system thereof can be connected. Electric lines are represented with solid lines and pneumatic lines are represented with dotted lines. With the exception of the specific features below, the design of the brake system 1' corresponds to the design the brake system 1 of the commercial vehicle according to FIG. 1.

A third brake circuit 41 is arranged for activating a brake system of the trailer vehicle 40. Similarly to the first brake circuit 11 and the second brake circuit 12, the third brake circuit 41 comprises a pressure control valve 16, a dual non-return valve 24 and a 3/2-way valve 22. The pressure control valve 16 of the third brake circuit 41, or the inlet valve 19 and outlet valve 20 thereof, can be controlled by the control unit 17. In contrast to the first brake circuit 11 and the second brake circuit 12, a brake pressure line 39 downstream of the pressure control valve 16 is connected to a control valve 43 that controls the connection between the fourth pressure reservoir 42 and a pneumatic coupling head 44. The brake system of the trailer vehicle 40 can be coupled to the coupling head 44.

In the exemplary embodiment shown, the control valve 43 is pre-controlled by the pressure in the brake pressure line 39, so that the brake system can be activated or controlled indirectly by the brake system 1' of the commercial vehicle

6. In the exemplary embodiment shown, the brake system of the trailer vehicle 40 is supplied from a fourth pressure reservoir 42 that can be enabled by the pre-control. In said design, a very small volume, namely only the volume of the brake pressure line 39, is to be ventilated or vented by the pressure control valve 16. The adjustment of the brake pressure in the brake pressure line is carried out according to the following description.

Exemplary embodiments for the adjustment of the brake pressure in the external braking mode according to an external braking demand 25 are described in detail below using FIGS. 3 through 7.

Figure 3:
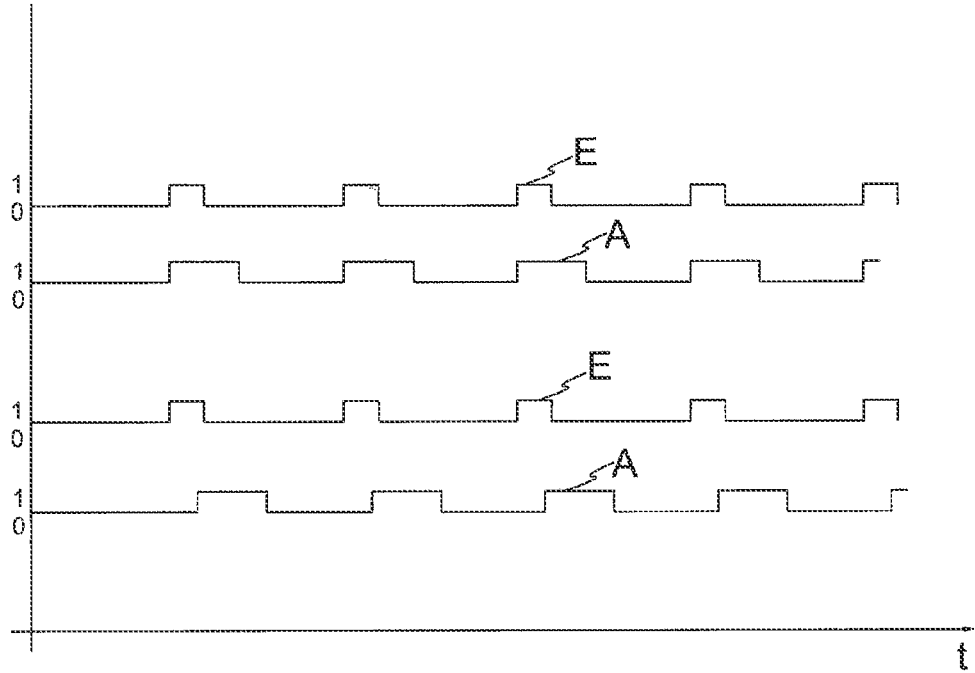
FIG. 3 shows a graph of time profiles of the actuation of inlet valves and outlet valves.

According to the invention, the control times of the outlet valve are determined by the control unit depending on the control of the inlet valve of the respective pressure control valve, whereby very small pressure steps can be controlled. FIG. 3 shows time profiles of the switch-on state of the inlet valve and of the outlet valve for two examples during an external braking mode. In the time profiles, in this case the switch state "1" represents the switched-on state of the respective valve and the switch state "0" represents the switched-off state of the respective valve. A switch state E of the inlet valve and a switch state A of the outlet valve are represented for each exemplary embodiment.

During braking, in the exemplary embodiment shown because of an external braking demand, the pressure control valves for implementing the braking demand in the lower brake pressure range in both exemplary embodiments are actuated such that the opening times of the inlet valve and the outlet valve overlap. In the first exemplary embodiment according to FIG. 3, the actuation of the outlet valve is carried out approximately at the same time as the actuation of the inlet valve. The other exemplary embodiment shows a time-offset actuation of the outlet valve after the actuation of the inlet valve. In further exemplary embodiments that are not shown, the actuation is carried out immediately after ending actuation of the inlet valve or slightly offset in time after ending the actuation of the inlet valve. Each pressure control valve 22 can preferably carry out one of three aforementioned actuations independently of the actuation of the other pressure control valves 22.

Figure 4:
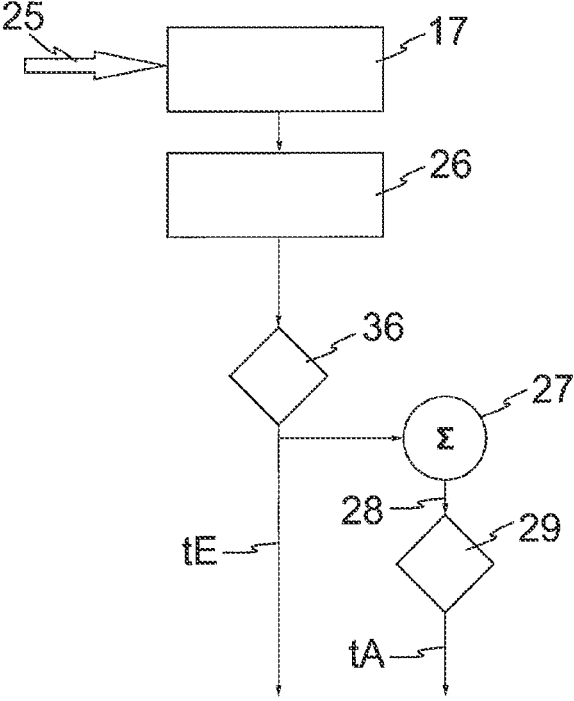
FIG. 4 shows a flow chart of a first exemplary embodiment of a method for adjusting the brake pressure in the external braking mode.

FIG. 4 shows a method for determining the control times tA of the outlet valve depending on the control of the inlet valve. If the control unit 17 detects an external braking demand 25, then the control unit switches into the external braking mode 26, whereby the brake pressure is adjusted by actuating the pressure control valve and in doing so the control times of the outlet valve are determined depending on the control of the inlet valve. In this case, the multiple actuations of the inlet valve during the build-up of brake pressure are counted in a counting step 27. The control times tA of the outlet valve are determined depending on the number 28 of already completed actuations of the inlet valve.

Figure 5:
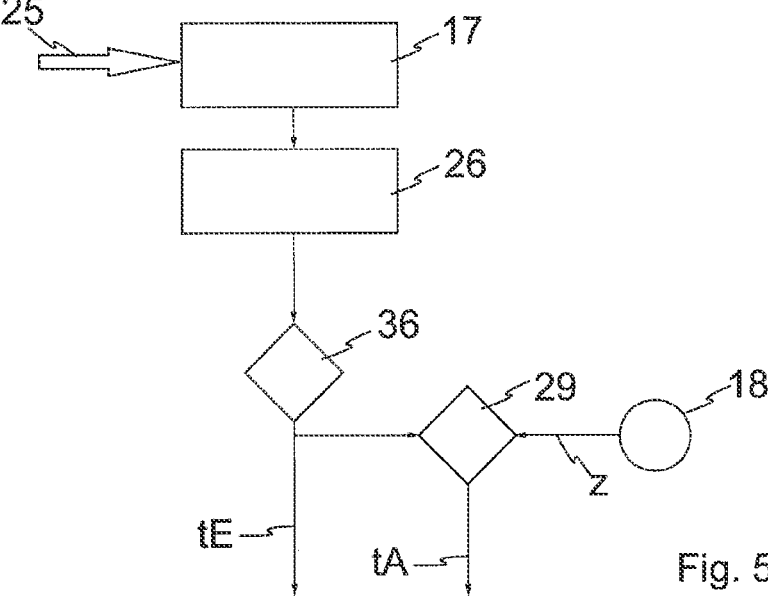
FIG. 5 shows a flow chart of a second exemplary embodiment of a method for adjusting the brake pressure in the external braking mode.

FIG. 5 shows a further exemplary embodiment of a method for adjusting the brake pressure in the external braking mode 26, whereby the same reference characters are used for identical features as in FIG. 4. In the exemplary embodiment according to FIG. 5, the control times tA of the outlet valve are determined depending on the control times tE of the inlet valve. For this purpose, in the external braking mode 26 the control time tE of the inlet valve is determined and taken into account during the determination of the control time tA of the outlet valve. In a determination step 29, the control time tA of the outlet valve is determined while taking into account a correction factor 30. The inlet times tE of the inlet valve are weighted with the correction factor 30 in order to determine values for the control times tA of the outlet valve. In the exemplary embodiment according to FIG. 5, the correction factor is constantly determined as a function of a measured deceleration of the vehicle z according to predetermined determination instructions 31. The vehicle deceleration z is advantageously derived from the measurement values of the revolution rate sensors 18 (FIG. 1).

Figure 6:
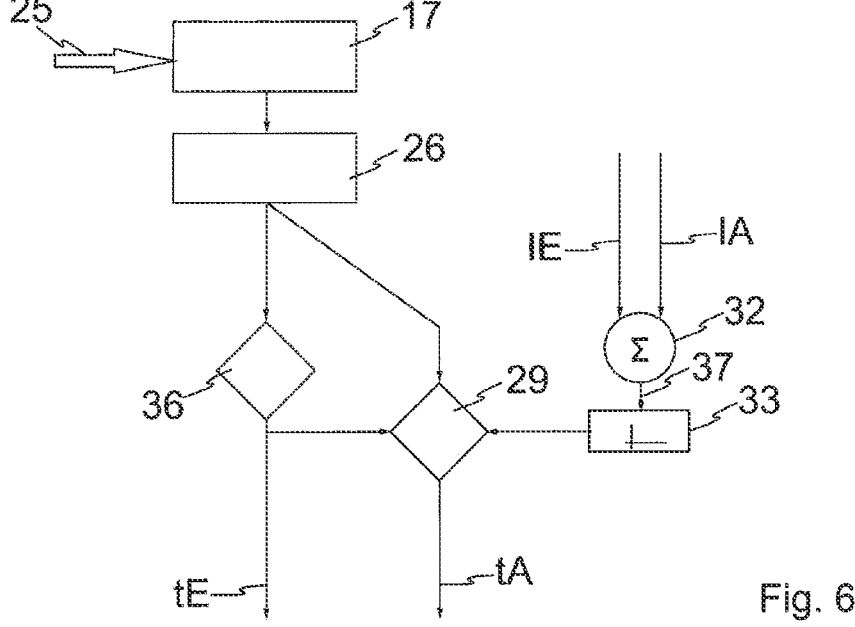
FIG. 6 shows a flow chart of a third exemplary embodiment of a method for adjusting the brake pressure in the external braking mode.

FIG. 6 shows a further exemplary embodiment of a method for adjusting the brake pressure, whereby the same reference characters as in FIGS. 4 and 5 are used for the same features. As in the exemplary embodiment according to FIG. 5, in the exemplary embodiment according to FIG. 6 the control time tA of the outlet valve is also determined as a function of the control time tE of the inlet valve and a correction factor 30. In contrast to the exemplary embodiment according to FIG. 5, the correction factor 30 is determined according to a predetermined characteristic curve 33 as a function of a sum of the control times tE of already completed actuations of the inlet valve and the control times of the outlet valve that were determined previously in connection with a reduction of the brake pressure. For this purpose, information IE about the control times of already completed actuations of the inlet valve and information IA about control times of the outlet valve that were previously determined and stored in connection with a reduction of the brake pressure outside of the external braking mode are combined in a summation step 32. Using the summation value 37 formed in the summation step, the correction factor 30 is determined from a predetermined characteristic curve 33 and the control time tE of the inlet valve is weighted with the correction factor 30 in order to determine the control time tA of the outlet valve.

Figure 7:
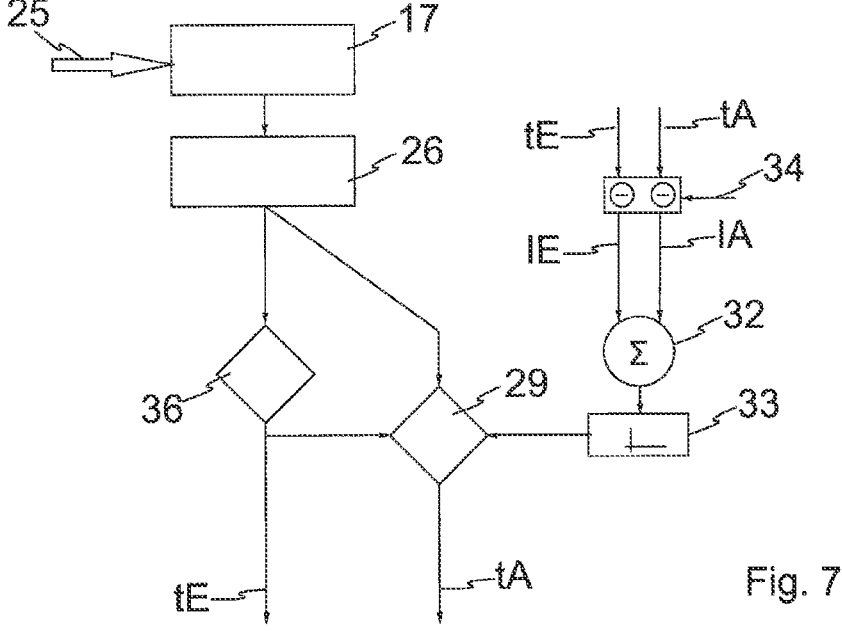
FIG. 7 shows a flow chart of a fourth exemplary embodiment of a method for adjusting the brake pressure in the external braking mode.

FIG. 7 shows a further exemplary embodiment of a method for adjusting the brake pressure and in particular for determining the on control time tA of the outlet valve as a function of the control time tE of the inlet valve. The exemplary embodiment according to FIG. 7 corresponds to the exemplary embodiment according to FIG. 6 with the exception of the following differences, i.e. in particular that a correction factor 30 is determined according to a predetermined characteristic curve 33 as a function of a sum of the control times of already completed actuations of the inlet valve and the control times of the outlet valve that have previously been determined in connection with a reduction of the brake pressure.

In contrast to the exemplary embodiment according to FIG. 6, in the summation step 32 a predetermined time constant 34 of the previously stored control times tE of the inlet valve and control times tA of the outlet valve is subtracted in each case from the control times of the inlet valve and of the outlet valve that are to be summed in a correction step 35. The time constant takes into account, in the case of different control times of the inlet valve and the outlet valve, an initial dead time or reaction time, in which no brake pressure is actuated apart from an effective valve opening time. Accordingly, the time constant 34 that is to be subtracted is predetermined and is provided for the correction step 35 in the external braking mode 26.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE CHARACTER LIST (PART OF THE DESCRIPTION)

1, 1' brake system
2 front axle
3 rear axle
4 wheel
5 brake cylinder
6 motor vehicle
7 spring mechanism
8 brake pedal
9 service brake valve
10 first brake circuit
11 first pressure reservoir
12 second brake circuit
13 second pressure reservoir
14 first relay valve
15 second relay valve
16 pressure control valve
17 control unit
18 revolution rate sensor
19 inlet valve
20 outlet valve
21 control input
22 3/2-way valve
23 third pressure reservoir
24 dual non-return valve
25 external braking demand
26 external braking mode
27 counting step
28 number
29 determination step
30 correction factor
31 determination instructions
32 summation step
33 characteristic curve
34 time constant
35 correction step
36 determination step
37 summation value
38 brake pressure line
39 trailer brake pressure line
40 trailer vehicle
41 third brake circuit
42 fourth pressure reservoir
43 control valve
44 coupling head tE inlet valve control time
tA outlet valve control time
E inlet valve switch state
A outlet valve switch state
Z deceleration of the vehicle
IE inlet valve information
IA outlet valve information

The invention claimed is:

1. A method for adjusting brake pressures of a motor vehicle, the method comprising:

actuating, by a control unit, while taking into account determined dynamic state variables of wheels that are to be braked, a pressure control valve with an inlet valve for ventilating and with an outlet valve for venting a brake pressure line that is controlled by the pressure control valve, wherein control times of the outlet valve are determined depending on control of the inlet valve, wherein, in an external braking mode provided for a case where an external braking demand is received that is independent of a driver's braking demand, the control unit adjusts the brake pressure in the brake pressure line according to the external braking demand by determining control times of the outlet valve depending on control of the inlet valve, and wherein the control times of the outlet valve vary from control times of the inlet valve in terms of duration and/or start time.

2. The method as claimed in claim 1, wherein the control times of the inlet valve and the control times of the outlet valve at least partly overlap.

3. The method as claimed in claim 2, wherein the control times of the inlet valve and the control times of the outlet valve have varying start times and partially overlap.

4. The method as claimed in claim 1, wherein a number of actuations of the inlet valve during a build-up of brake pressure are counted and the control times of the outlet valve are determined depending on a number of already completed actuations of the inlet valve.

5. The method as claimed in claim 1, wherein a brake cylinder is vented or ventilated via the brake pressure line on a side of a pressure control valve lying on another side of a pressure control reservoir.

6. The method as claimed in claim 1, wherein the control times of the outlet valve are determined as a function of control times of the inlet valve.

7. The method as claimed in claim 1, wherein the control times of the outlet valve vary from the control times of the inlet valve in terms of both duration and start time.

8. The method as claimed in claim 1, wherein the control times of the outlet valve occur immediately after control times of the inlet valve, and wherein a respective control time of the control times of the outlet valve depend on a past control time of the control times of the inlet valve.

9. A method for adjusting brake pressures of a motor vehicle, the method comprising:

actuating, by a control unit, while taking into account determined dynamic state variables of wheels that are to be braked, a pressure control valve with an inlet valve for ventilating and with an outlet valve for venting the brake pressure line that is controlled by the pressure control valve, wherein control times of the outlet valve are determined depending on control of the inlet valve and as a function of control times of the inlet valve, wherein during a braking process a correction factor is determined, with which the control times of the inlet valve are weighted for determining the control times of the outlet valve, and wherein the control times of the outlet valve vary from the control times of the inlet valve in terms of duration and/or start time.

10. The method as claimed in claim 9, wherein the control times of the inlet valve and the control times of the outlet valve at least partly overlap.

11. The method as claimed in claim 9, wherein the correction factor is constantly determined as a function of a measured deceleration of the vehicle according to predetermined determination instructions.

12. The method as claimed in claim 9, wherein the correction factor is determined according to a predetermined characteristic curve as a function of a sum of the control times of already completed actuations of the inlet valve and control times of the outlet valve that were previously determined in connection with a reduction of the brake pressure.

13. The method as claimed in claim 12, wherein a predetermined time constant is subtracted from the control times of the inlet valve and the control times of the outlet valve that are to be summed.

14. The method as claimed in claim 9, wherein a number of actuations of the inlet valve during a build-up of brake pressure are counted and the control times of the outlet valve are determined depending on a number of already completed actuations of the inlet valve.

15. A method for adjusting brake pressures of a motor vehicle, the method comprising:

actuating, by a control unit, while taking into account determined dynamic state variables of wheels that are to be braked, a pressure control valve with an inlet valve for ventilating and with an outlet valve for venting the brake pressure line that is controlled by the pressure control valve, wherein control times of the outlet valve are determined depending on control of the inlet valve, wherein a brake system of a trailer vehicle can be indirectly activated via a brake pressure line for the trailer vehicle and a pressure control valve disposed in the brake pressure line, and wherein the control times of the outlet valve vary from control times of the inlet valve in terms of duration and/or start time.

16. The method as claimed in claim 15, wherein the control times of the inlet valve and the control times of the outlet valve at least partly overlap.

17. The method as claimed in claim 15, wherein a number of actuations of the inlet valve during a build-up of brake pressure are counted and the control times of the outlet valve are determined depending on a number of already completed actuations of the inlet valve.

18. The brake system as claimed in claim 15, wherein the control unit is configured to receive an external braking demand that is independent of a driver's braking demand.

19. The brake system as claimed in claim 15, wherein the brake pressure lines are connected to a brake cylinder on a side of a pressure control valve lying on a side of a pressure reservoir.

20. The brake system as claimed in claim 15, wherein a brake pressure line for a trailer vehicle with a pressure control valve disposed in the brake pressure line is connected to a pneumatic coupling head, to which a brake system of the trailer vehicle can be coupled and can be activated via the brake pressure line for the trailer vehicle.

\* \* \* \* \*